(12) United States Patent
Forgang et al.

(10) Patent No.: US 7,432,716 B2
(45) Date of Patent: Oct. 7, 2008

(54) METHOD FOR COMPENSATING DIELECTRIC ATTENUATION IN DOWNHOLE GALVANIC MEASUREMENTS

(75) Inventors: Stanislav W. Forgang, Houston, TX (US); Gregory B. Itskovich, Houston, TX (US); Randy Gold, Houston, TX (US); Homero Castillo, Kingwood, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/601,961

(22) Filed: Nov. 20, 2006

(65) Prior Publication Data

US 2007/0103159 A1    May 10, 2007

Related U.S. Application Data

(63) Continuation-in-part of application No. 10/986,096, filed on Nov. 12, 2004, now abandoned.

(51) Int. Cl.
*G01V 3/00* (2006.01)
(52) U.S. Cl. ..................... 324/355; 324/367
(58) Field of Classification Search ............ 324/338, 324/355, 368, 367, 346, 351, 352, 353
See application file for complete search history.

(56) References Cited

U.S. PATENT DOCUMENTS

| | | | |
|---|---|---|---|
| 2,239,466 A | 4/1941 | Neufeld | 175/182 |
| 2,919,396 A | 12/1959 | McLaughlin et al. | 324/5 |
| 2,930,969 A | 3/1960 | Baker | 324/10 |
| 3,365,658 A | 1/1968 | Birdwell | 324/10 |
| 3,973,181 A | 8/1976 | Calvert | 324/5 |
| 4,122,387 A | 10/1978 | Ajam et al. | 324/10 |
| 4,468,623 A | 8/1984 | Gianzero et al. | 324/367 |
| 4,686,477 A | 8/1987 | Givens et al. | 324/366 |
| 4,899,112 A | 2/1990 | Clark et al. | 324/338 |
| 4,980,642 A | 12/1990 | Rodney | 324/325 |
| 5,442,294 A | 8/1995 | Rorden | 324/339 |
| 5,502,686 A | 3/1996 | Dory et al. | 367/34 |
| 5,543,715 A | 8/1996 | Singer et al. | 324/368 |
| 5,869,968 A | 2/1999 | Brooks et al. | |
| 5,900,733 A | 5/1999 | Wu et al. | 324/338 |

(Continued)

FOREIGN PATENT DOCUMENTS

CA        685727        5/1964

OTHER PUBLICATIONS

Se-Yuen Mak; The RLC circuit and the determination of inductance, Phys. Educ. 29 (1994), pp. 94-97.

(Continued)

*Primary Examiner*—Patrick Assouad
*Assistant Examiner*—David M. Schindler
(74) *Attorney, Agent, or Firm*—Madan, Mossman & Sriram, P.C.

(57) ABSTRACT

A logging tool used in a borehole having non-conductive mud. The tool includes a known inductance in series with an electrode. The quality factor of a circuit that includes the electrode, the inductance and the earth formation is indicative of the resistivity of the formation. The quality factor may be determined using either a plurality of signals or by measuring a transient response.

18 Claims, 5 Drawing Sheets

U.S. PATENT DOCUMENTS

| | | |
|---|---|---|
| 6,351,129 B1 | 2/2002 | Gounot ........................ 324/368 |
| 6,369,575 B1 | 4/2002 | Eisenmann et al. ......... 324/373 |
| 6,384,605 B1 | 5/2002 | Li ................................ 324/338 |
| 2004/0051531 A1 | 3/2004 | Chemali et al. ............. 324/367 |
| 2005/0006090 A1 | 1/2005 | Chemali et al. |
| 2005/0030034 A1* | 2/2005 | Ganesan ..................... 324/324 |
| 2005/0134280 A1 | 6/2005 | Bittar et al. ................. 324/367 |
| 2006/0255811 A1 | 11/2006 | Bittar et al. ................. 324/367 |
| 2007/0007967 A1 | 1/2007 | Itskovich et al. ............ 324/367 |
| 2007/0030008 A1 | 2/2007 | Cheung et al. .............. 324/367 |
| 2007/0046290 A1 | 3/2007 | Bespalov et al. ............ 324/367 |
| 2007/0103162 A1 | 5/2007 | Morys et al. ................ 324/367 |
| 2007/0222453 A1* | 9/2007 | Reiderman et al. .......... 324/333 |
| 2007/0279063 A1* | 12/2007 | Beard ......................... 324/355 |

OTHER PUBLICATIONS

Petersan et al.; Measurement of resonant frequency and quality factor of microwave resonators: Comparison of methods, Journal of Applied Physics, vol. 84, No. 6, Sep. 15, 1998, pp. 3392-3402.

* cited by examiner

METHOD FOR COMPENSATING DIELECTRIC ATTENUATION IN DOWNHOLE GALVANIC MEASUREMENTS

CROSS-REFERENCES TO RELATED APPLICATIONS

This application is a continuation-in-part of U.S. patent application Ser. No. 10/986,096 filed on 12 Nov. 2004.

BACKGROUND OF THE INVENTION

1. Field of the Invention

This invention generally relates to explorations for hydrocarbons involving investigations of regions of an earth formation that may be penetrated by a borehole. More specifically, the invention deals with the problem of accurately measuring a resistivity of earth formation and imaging of earth formations using a logging tool in a borehole having a non-conductive mud.

2. Background of the Art

Electrical earth borehole logging is well known and various devices and various techniques have been described for this purpose. Broadly speaking, there are two categories of devices used in electrical logging devices. In the first category, a measure electrode (current source or sink) are used in conjunction with a diffuse return electrode (such as the tool body). A measure current flows in a circuit that connects a current source to the measure electrode, through the earth formation to the return electrode and back to the current source in the tool. In inductive measuring tools, an antenna within the measuring instrument induces a current flow within the earth formation. The magnitude of the induced current is detected using either the same antenna or a separate receiver antenna. The present invention belongs to the first category.

There are several modes of operation: in one, the current at the measuring electrode is maintained constant and a voltage is measured while in the second mode, the voltage of the electrode is fixed and the current flowing from the electrode is measured. Ideally, it is desirable that if the current is varied to maintain constant the voltage measured at a monitor electrode, the current is inversely proportional to the resistivity of the earth formation being investigated. Conversely, it is desirable that if this current is maintained constant, the voltage measured at a monitor electrode is proportional to the resistivity of the earth formation being investigated. Ohm's law teaches that if both current and voltage vary, the resistivity of the earth formation is proportional to the ratio of the voltage to the current.

Birdwell (U.S. Pat. No. 3,365,658) teaches the use of a focused electrode for determination of the resistivity of subsurface formations. A survey current is emitted from a central survey electrode into adjacent earth formations. This survey current is focused into a relatively narrow beam of current outwardly from the borehole by use of a focusing current emitted from nearby focusing electrodes located adjacent the survey electrode and on either side thereof. Ajam et al (U.S. Pat. No. 4,122,387) discloses an apparatus wherein simultaneous logs may be made at different lateral distances through a formation from a borehole by guard electrode systems located on a sonde which is lowered into the borehole by a logging cable. A single oscillator controls the frequency of two formation currents flowing through the formation at the desired different lateral depths from the borehole. The armor of the logging cable acts as the current return for one of the guard electrode systems, and a cable electrode in a cable electrode assembly immediately above the logging sonde acts as the current return for the second guard electrode system. Two embodiments are also disclosed for measuring reference voltages between electrodes in the cable electrode assembly and the guard electrode systems Techniques for investigating the earth formation with arrays of measuring electrodes have been proposed. See, for example, the U.S. Pat. No. 2,930,969 to Baker, Canadian Pat. No. 685,727 to Mann et al., U.S. Pat. No. 4,468,623 to Gianzero, and U.S. Pat. No. 5,502,686 to Dory et al.

A drawback with the use of contact devices injecting electrical currents into a wellbore arises when oil-based muds are used in drilling. Oil-based muds must be used when drilling through water soluble formations: an increasing number of present day exploration prospects lie beneath salt layers. Besides reducing the electrical contact between the logging tool and the formation, invasion of porous formations by a resistive, oil-based mud greatly reduces the effectiveness of prior art resistivity imaging devices. This problem is not alleviated by the use of focusing electrodes.

It would be desirable to have an apparatus and method of determination of formation resistivity that is relatively insensitive to borehole rugosity and can be used with either water based or with oil-based muds. The present invention satisfies this need.

SUMMARY OF THE INVENTION

One embodiment of the disclosure is an apparatus for evaluating an earth formation. The apparatus includes a logging tool conveyed in a borehole, logging tools including at least one electrode configured to convey a current into the formation, the borehole including a substantially non-conducting liquid. The apparatus includes an inductor having a known inductance in series with the at least one electrode, and a processor configured to estimate an electrical quality factor in response to the at least one electrode to an excitation by a power source and estimate a resistivity of the earth formation from the estimated quality factor and the known inductance. The power source may be multi-frequency source and the processor may be further configured to estimate the quality factor using the response at each of a plurality of frequencies. The power source may be a step source and a processor may be further configured to estimate the quality factor from a transient response. The at least one electrode may include a plurality of electrodes and the processor may be further configured to produce a resistivity image of the formation. The apparatus may include a conveyance device configured to convey or logging tool into the borehole, the conveyance device being a wireline and/or a drilling tubular.

Another embodiment of the disclosure is a method of evaluating an earth formation. The method includes conveying a logging tool in a borehole in the earth formation, the borehole including a substantially non-conducting fluid. The method includes using at least one electrode on the logging tool to convey a current into the formation, estimating a quality factor of the response of the at least one electrode to an excitation by a power source, and estimating a resistivity of the formation from the estimated quality factor and a known inductance of an inductor in series with the at least one electrode. The current may be conveyed at a plurality of frequencies in the quality factor may be estimated from a resonant frequency and the bandwidth. The power source may be a step source and the processor may be further configured to estimate the quality factor from a transient response. The at least one electrode may include a plurality of electrodes and the method may include producing a resistivity image of the formation. The logging tool may be conveyed into the borehole on a conveyance device that may be a wireline and/or a drilling tubular.

Another embodiment is a computer-readable medium for use with an apparatus for evaluating an earth formation. The apparatus includes a logging tool conveyed in a borehole, the logging tool including at least one electrode configured to convey a current into the formation, the borehole including a substantially nonconducting liquid. The apparatus also includes an inductor having a known inductance in series with the at least one electrode. The medium includes instructions that enables the processor to estimate a quality factor of a response of the at least one electrode to an excitation by a power source and estimate a resistivity of the earth formation from the estimated quality factor and a known inductance. The medium may include a ROM, an EPROM, an EAROM, a flash memory, and/or an optical disk.

BRIEF DESCRIPTION OF THE FIGURES

The present invention is best understood with reference to the accompanying figures in which like numerals refer to like elements and in which.

DETAILED DESCRIPTION OF THE INVENTION

Figure 1:
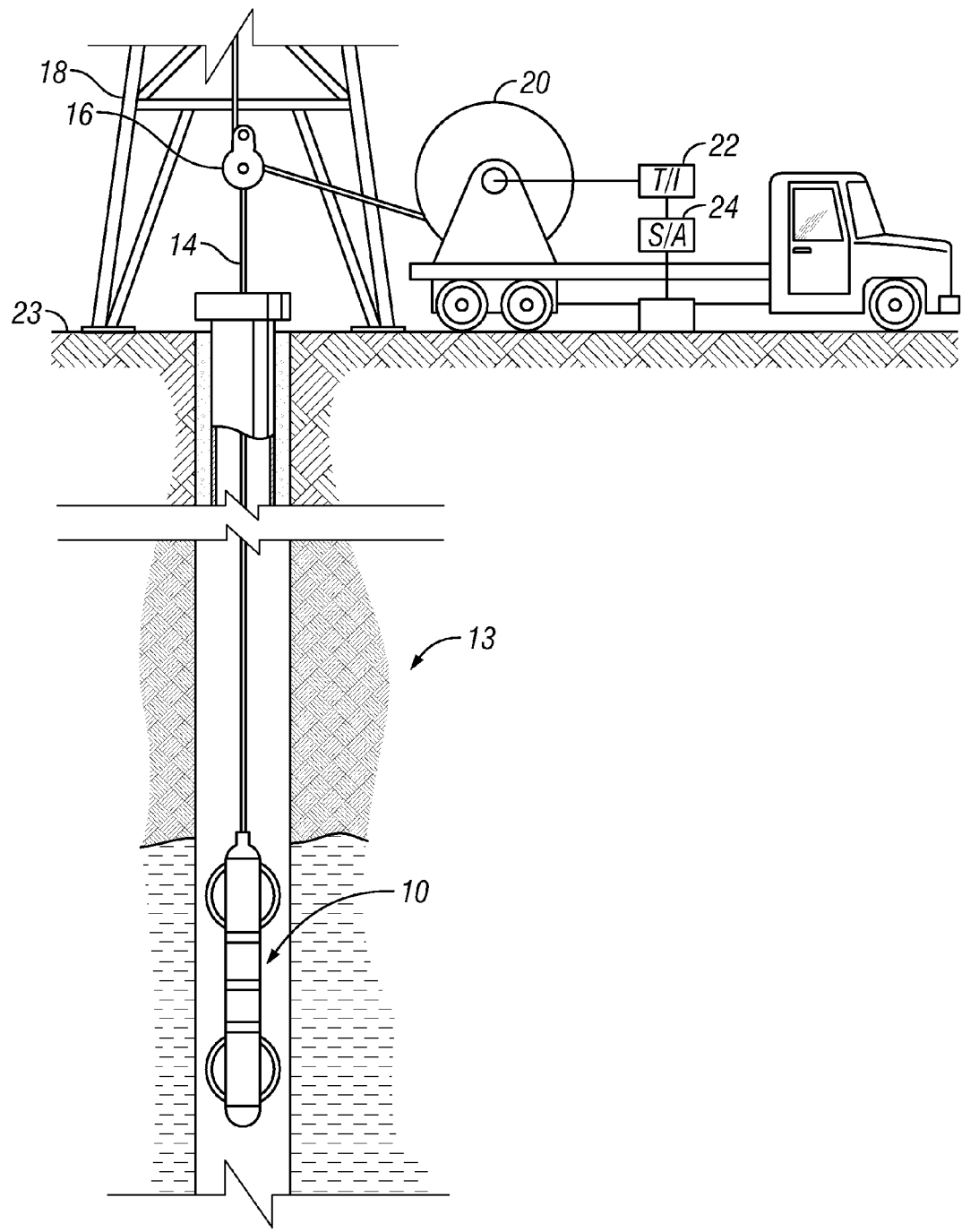
FIG. 1 (prior art) shows the imaging tool of this invention suspended in a borehole.

FIG. 1 shows an imaging tool 10 suspended in a borehole 12, that penetrates earth formations such as 13, from a suitable cable 14 that passes over a sheave 16 mounted on drilling rig 18. By industry standard, the cable 14 includes a stress member and seven conductors for transmitting commands to the tool and for receiving data back from the tool as well as power for the tool. The tool 10 is raised and lowered by draw works 20. Electronic module 22, on the surface 23, transmits the required operating commands downhole and in return, receives data back which may be recorded on an archival storage medium of any desired type for concurrent or later processing. The data may be transmitted in analog or digital form. Data processors such as a suitable computer 24, may be provided for performing data analysis in the field in real time or the recorded data may be sent to a processing center or both for post processing of the data. Some of the data processing may also be done by a downhole computer.

Figures 2A, 2B:
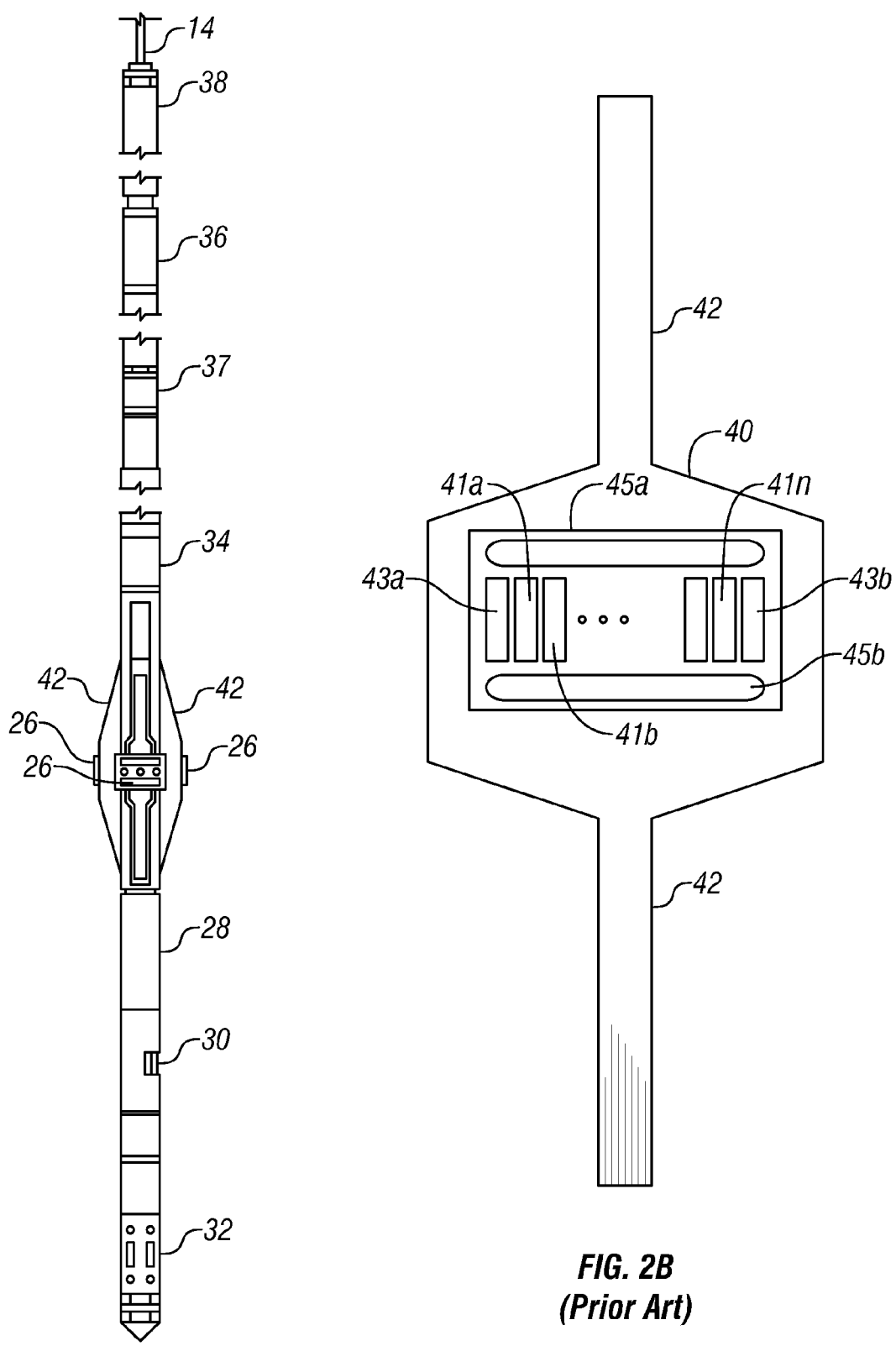
FIG. 2a (prior art) is a mechanical schematic view of an imaging tool using the present invention.
FIG. 2b (prior art) is a detail view of an exemplary electrode pad.

FIG. 2a is a schematic external view of a borehole sidewall imager system. The tool 10 comprising the imager system includes resistivity arrays 26 and, optionally, a mud cell 30 and a circumferential acoustic televiewer 32. Electronics modules 28 and 38 may be located at suitable locations in the system and not necessarily in the locations indicated. The components may be mounted on a mandrel 34 in a conventional well-known manner. An orientation module 36 including a magnetometer and an accelerometer or inertial guidance system may be mounted above the imaging assemblies 26 and 32. The upper portion 38 of the tool 10 contains a telemetry module for sampling, digitizing and transmission of the data samples from the various components uphole to surface electronics 22 in a conventional manner. If acoustic data are acquired, they are preferably digitized, although in an alternate arrangement, the data may be retained in analog form for transmission to the surface where it is later digitized by surface electronics 22.

Also shown in FIG. 2a are three resistivity arrays 26 (a fourth array is hidden in this view. Referring to FIGS. 2a and 2b, each array includes measure electrodes 41a, 41b, . . . 41n for injecting electrical currents into the formation, focusing electrodes 43a, 43b for horizontal focusing of the electrical currents from the measure electrodes and focusing electrodes 45a, 45b for vertical focusing of the electrical currents from the measure electrodes. By convention, "vertical" refers to the direction along the axis of the borehole and "horizontal" refers to a plane perpendicular to the vertical. The method of the present invention may also be used with tools that do not have the focusing electrodes.

Figure 3:
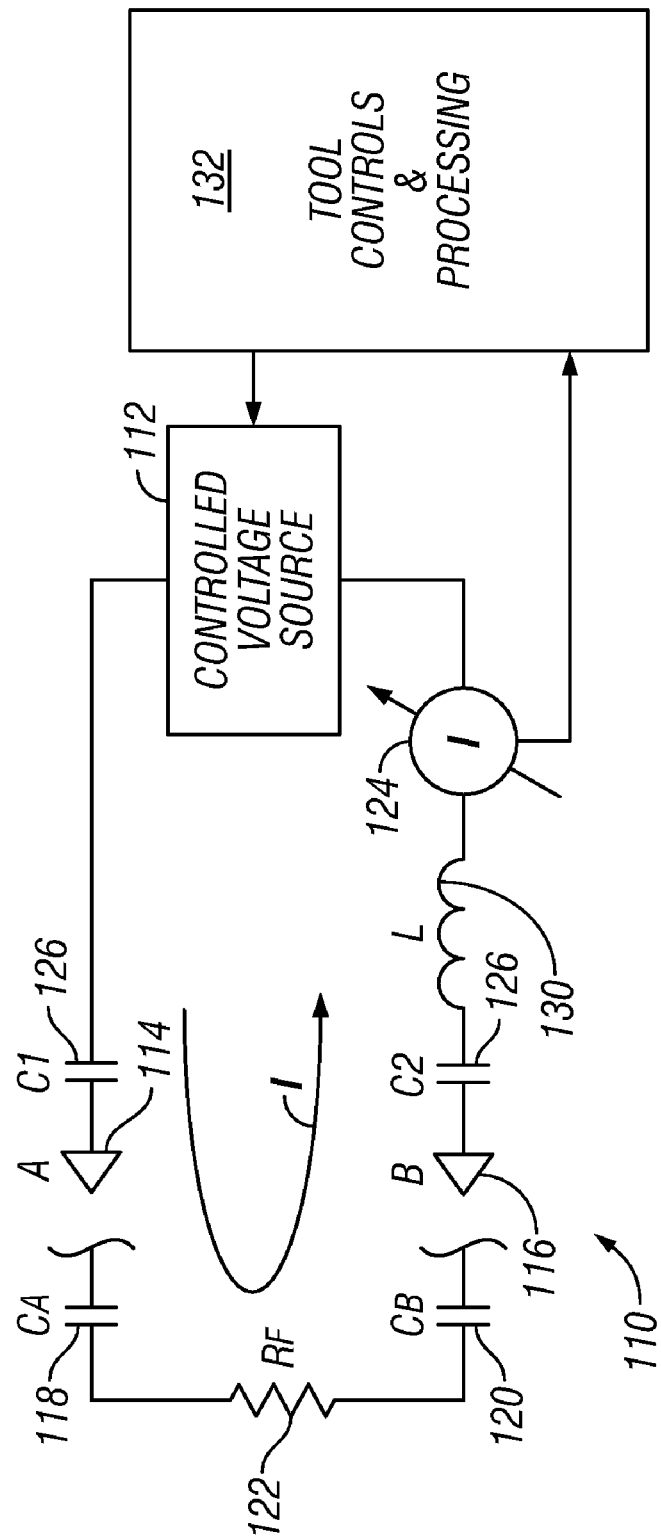
FIG. 3 is a schematic block diagram of the present measurement circuit.

Referring to FIG. 3, a driving circuit for resistivity galvanic tools is illustrated, and generally identified by the numeral 110. Circuit 110 includes a source of driving voltage 112, a source electrode A, 114 and a return electrode B, 116. Current I, established from voltage source 112 flows to the mud in the bore hole from electrode 114, then into the formation, and returns to electrode 116 through the mud. The impedances of the mud and formation are respectively presented by capacitive elements $C_A$ 118 and $C_B$, 120 for the mud and active losses $R_F$ 122 for the formation. In the case of logging or MWD in non-conductive, oil-based, mud the parasitic attenuation presented by the mud impedance can become very large and in many cases results in poor measurement quality The present circuit 110 is utilized to correct the above-stated problem by introducing a permanent inductor together with two capacitors connected in series in the test current loop 123. A capacitor $C_1$, 126 is connected to source electrode 114. A capacitor $C_2$, 128 is connected to return electrode 116. Inductor, L, 130 is connected in series with capacitor 128 or capacitor 126. Circuit 110 is energized by voltage source 112 and the circuit 110 current is measured at current loop 120. The operation of circuit 110 is under control provided by tool controls and processing 132.

Capacitors 126 and 128 establish a maximum capacitance the circuit 110 could see in well operation. If for any operational reason, the mud becomes conductive or the tool pad touches the well bore wall, the equivalent capacitance disappears and only the capacitance of capacitors 126 and 128 exist. Capacitors 126 and 128 connected in series with permanent inductor 130 establish minimum operational tool frequency expressed as follows:

$$f = \frac{1}{2\pi\sqrt{LC_t}}, \tag{1}$$

where total capacitance C will be the tool capacitance as follows:

$$C_t = \frac{C_1 C_2}{C_1 + C_2}. \tag{2}$$

In practice, capacitors 126 and 128 may be formed by insulation layer deposited on the external surface of the electrodes 114 and 116.

While operation in non-conductive environment, the total capacitance C connected in series with inductor 130 will decrease further as:

$$C = \frac{C_t(C_A + C_B)}{C_t + C_A + C_B}. \quad (3)$$

which would result in raising the resonant frequency frequency f to a value given by $$f = \frac{1}{2\pi\sqrt{LC}}. \quad (4)$$

Figure 4:
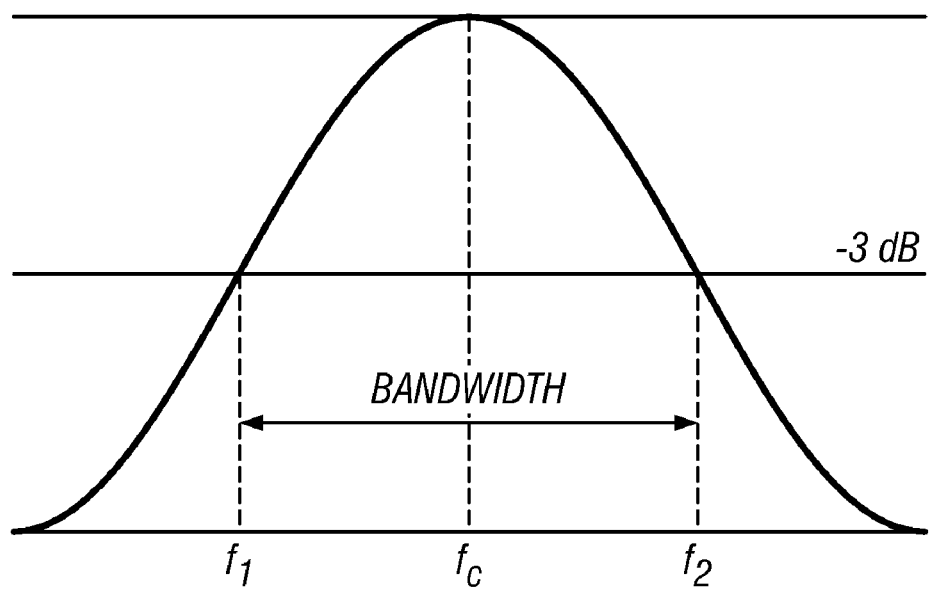
FIG. 4 is an exemplary frequency domain response of the circuit of FIG. 3.

The present tool operation functions in one of two modes, sweeping the voltage source 112 frequency and a transient mode. In the swept frequency mode, the current in the circuit has a response such as that shown in FIG. 4. Currents are generated at a plurality of frequencies above the minimum operational frequency defined above. The current has a maximum at the frequency $f_c$ given by equation (1) and has a bandwidth defined by the values at which the current is down 3 dB from the peak current. The magnitude of the current at the resonant frequency is $$I_{fc} = \frac{V}{R_F}, \quad (4)$$

so that, in principle, it is possible to get the resistive load of the circuit by measuring the maximum value of the current. In practice, this is not a robust measurement. Instead, in one embodiment of the present invention, use is made of the relation between the bandwidth, resonant frequency and the resistive load.

The Quality of the series tuned circuit, or Q factor, is calculated as the ratio of the resonance frequency $\omega_o$ to the bandwidth $\Delta\omega$ (in radians per second):

$$Q = \frac{f_0}{\Delta f} = \frac{1}{R}\sqrt{\frac{L}{C}} = \frac{2\pi f_c L}{R}, \quad (5)$$

or $$R_F = \frac{2\pi f_c}{Q}. \quad (6)$$

Use of equation (6) gives a more robust estimate of the resistive load of the formation $R_F$ than does the use of equation (4). This quality factor is associated with the response of the electrode to an excitation by the voltage source.

Figure 5:
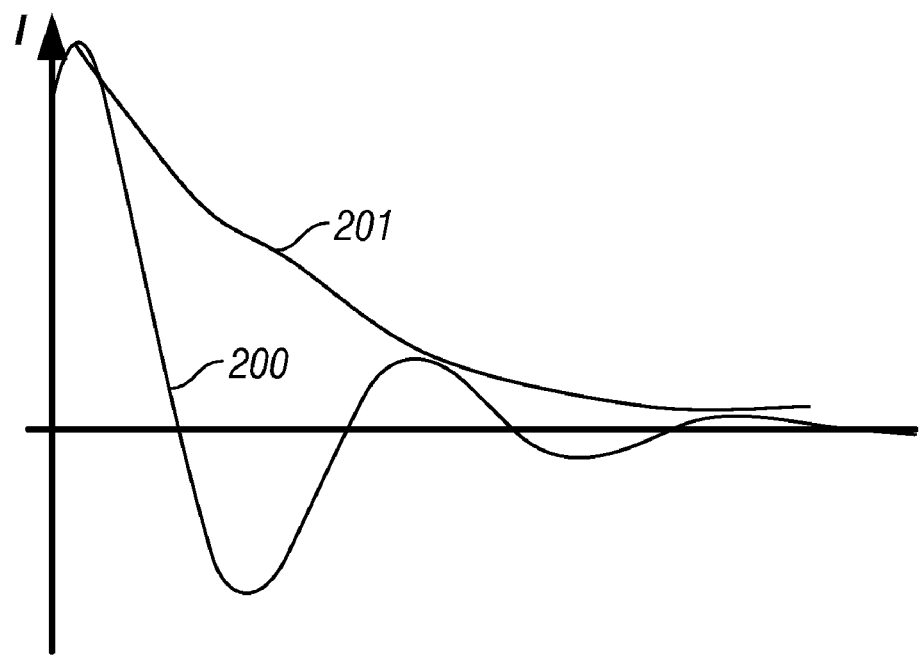
FIG. 5 is an exemplary time domain response of the circuit of FIG. 3.

The second approach for the present circuit employs a transient voltage V imposed on circuit 110, and subsequent measurement of circuit current is performed by current loop 124. The current is measured in any mode of the voltage V, i.e., due to its leading or falling edge. Measurements on the falling edge are preferable as in this case, the overall circuit is exposed to less noise that can be present in the source voltage 112. A transient curve, circuit current versus time after transient occurred is illustrated by 200 in FIG. 5.

The current has the form:

$$i(t) = e^{-\zeta t}[C\sin(\omega t) + D\cos(\omega t)] \quad (7),$$

where the damping coefficient $\zeta$ is given by $$\zeta = \frac{R}{2L}. \quad (8)$$

Equation (8) may be further written as $$\zeta = \frac{R}{2L} = \frac{\pi f_c}{Q}, \quad (9)$$

so that determination of $\zeta$ is seen to be equivalent to determining Q.

Figure 6:
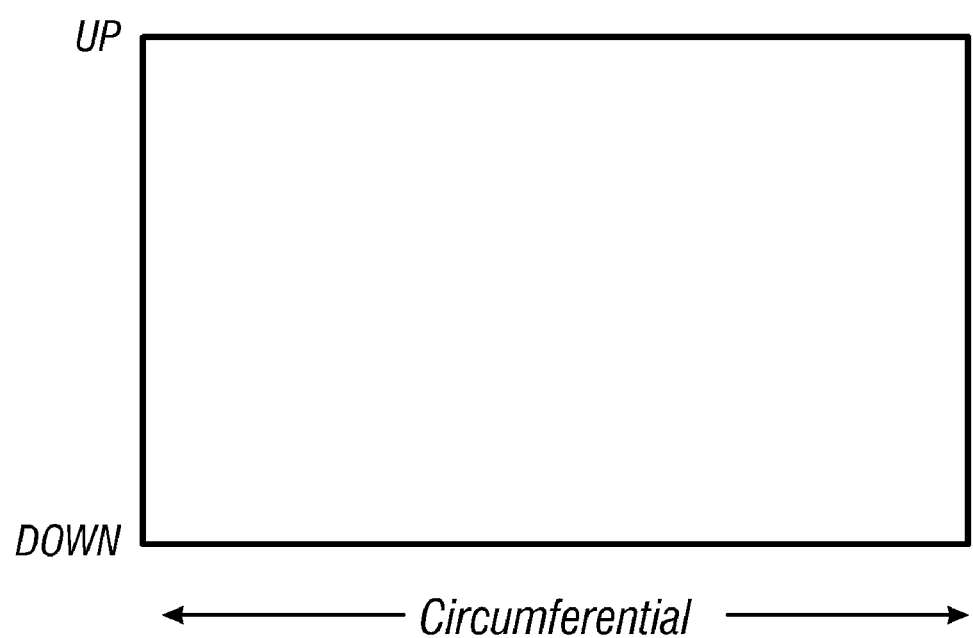
FIG. 6 shows a resistivity image of the borehole.

Accordingly, by fitting an exponential curve such as 201 to the envelope of the transient signal responsive to a voltage step, the damping coefficient may be determined. The formation resistivity is then determined using equation (8). An exemplary resistivity image of the borehole is shown in FIG. 6.

In one embodiment of the invention, an exponential fit is applied to the envelope of the signal. As would be known to those versed in the art, an "analytic" (complex time) signal I(t) can be constructed from a real-valued input signal i(t):

$$I(t) = i(t) + jh(t) \quad (10),$$

where,

I(t) is the analytic signal constructed from i(t) and its Hilbert transform i(t) is the input signal h(t) is the Hilbert Transform of the input signal. The instantaneous amplitude of the envelope of the transient signal is given by $[i^2(t)+h^2(t)]^{1/2}$, and fitting an exponential curve to the envelope gives the damping coefficient (and formation resistance).

The methods discussed above may be used in an imaging tool by applying the same procedure to each of the electrodes in the tool.

The operation of the transmitters and receivers may be done by a downhole processor and/or a surface processor. Implicit in the control and processing of the data is the use of a computer program on a suitable machine readable medium that enables the processor to perform the control and processing. The processing may include, for example, producing a resistivity image of the wall of the borehole using the filtered signals from the measure electrodes. The machine readable medium may include ROMs, EPROMs, EAROMs, Flash Memories and Optical disks. The term "processor" as used herein is intended to include Field Programmable Gate Arrays (FPGAs).

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. An apparatus for evaluating an earth formation, the apparatus comprising:
   (a) a logging tool configured to be conveyed in a borehole in the earth formation, the logging tool including at least one electrode configured to convey a current into the formation, the borehole including a substantially non-conducting liquid;
   (b) an inductor having a known inductance in series with the at least one electrode; and
   (c) a processor configured to:
      (i) estimate an electrical quality factor of a response of the at least one electrode to an excitation by a power source, and
      (ii) estimate a resistivity property of the earth formation from the estimated electrical quality factor and the known inductance.

2. The apparatus of claim 1 wherein the power source further comprises a multifrequency source and the processor is further configured to estimate the quality factor using the response at each of a plurality of frequencies.

3. The apparatus of claim 2 wherein the processor is further configured to use a relation of the form $$Q = \frac{f_0}{\Delta f} = \frac{1}{R}\sqrt{\frac{L}{C}} = \frac{2\pi f_c L}{R}$$

where Q is the quality factor, $f_c$ is a resonant frequency determined from an excitation at the plurality of frequencies, $\Delta f$ is a bandwidth, L is the known inductance and R is the estimated resistivity.

4. The apparatus of claim 1 wherein the power source further comprises a stepped source and the processor is further configured to estimate the quality factor from a transient response.

5. The apparatus of claim 4 wherein the processor is further configured to use a relation of the form:

$$\varsigma = \frac{R}{2L}$$

where $\varsigma$ is a decay constant of the response, R is the estimated resistivity and L is the known inductance.

6. The apparatus of claim 1 wherein the at least one electrode further comprises a plurality of electrodes and wherein the processor is further configured to produce a resistivity image of the formation.

7. The apparatus of claim 6 wherein the plurality of electrodes are disposed on a pad extendable from a body of the logging tool.

8. The apparatus of claim 1 further comprising a conveyance device configured to convey the logging tool into the borehole, the conveyance device selected from (i) a wireline, and (ii) a drilling tubular.

9. A method of evaluating an earth formation, the method comprising:
   (a) conveying a logging tool conveyed in a borehole in the earth formation, the borehole including a substantially non-conducting fluid,
   (b) using at least one electrode on the logging tool to convey a current into the formations,
   (c) estimating a quality factor of a response of the at least one electrode to an excitation by a power source, and
   (d) estimating a resistivity property of the earth formation from the estimated quality factor and a known inductance of an inductor in series with the at least one electrode.

10. The method of claim 9 further comprising conveying the current at a plurality of frequencies and estimating the quality factor from a resonant frequency and a bandwidth.

11. The method of claim 10 wherein estimating the quality factor further comprises using a relation of the form $$Q = \frac{f_0}{\Delta f} = \frac{1}{R}\sqrt{\frac{L}{C}} = \frac{2\pi f_c L}{R}$$

where Q is the quality factor, $f_c$ is a resonant frequency determined from an excitation at the plurality of frequencies, $\Delta f$ is a bandwidth, L is the known inductance and R is the estimated resistivity.

12. The method of claim 9 wherein the power source further comprises a stepped source and the processor is further configured to estimate the quality factor from a transient response.

13. The method of claim 12 wherein the processor is further configured to use a relation of the form:

$$\varsigma = \frac{R}{2L}$$

where $\varsigma$ is a decay constant of the response, R is the estimated resistivity and L is the known inductance.

14. The method of claim 9 wherein the at least one electrode further comprises a plurality of electrodes, the method further comprising producing a resistivity image of the formation.

15. The method of claim 14 wherein the plurality of electrodes are disposed on a pad extendable from a body of the logging tool.

16. The method of claim 1 further comprising a conveying the logging tool into the borehole on a conveyance device selected from (i) a wireline, and (ii) a drilling tubular.

17. A computer readable medium for use with an apparatus for evaluating an earth formation, the apparatus comprising:
   (a) a logging tool configured to be conveyed in a borehole in the earth formation, the logging tool including at least one electrode configured to convey a current into the formation, the borehole including a substantially non-conducting liquid; and
   (b) an inductor having a known inductance in series with the at least one electrode;
   the medium including instructions that enable a processor to:
   (c) estimate a quality factor of a response of the at least one electrode to an excitation by a power source, and
   (d) estimate a resistivity property of the earth formation from the estimated quality factor and the known inductance.

18. The medium of claim 17 further comprising at least one of (i) a ROM, (ii) an EPROM, (iii) an EAROM, (iv) a flash memory, and (v) an optical disk.

* * * * *